(12) United States Patent
Shibata

(10) Patent No.: US 7,367,178 B2
(45) Date of Patent: May 6, 2008

(54) GAS TURBINE SYSTEM

(75) Inventor: Takanori Shibata, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 329 days.

(21) Appl. No.: 11/188,854

(22) Filed: Jul. 26, 2005

(65) Prior Publication Data
US 2006/0277912 A1    Dec. 14, 2006

(30) Foreign Application Priority Data
Jul. 28, 2004    (JP) .............................. 2004-220360

(51) Int. Cl.
*F02C 3/30* (2006.01)
(52) U.S. Cl. ....................... 60/39.53; 60/728
(58) Field of Classification Search ............... 60/39.53, 60/39.54, 39.58, 39.59, 728
See application file for complete search history.

(56) References Cited

U.S. PATENT DOCUMENTS

| 5,088,280 A | 2/1992 | Scott-Scott et al. |
| 5,669,217 A * | 9/1997 | Anderson ................... 60/39.53 |
| 7,204,670 B1 * | 4/2007 | Meher-Homji et al. ..... 415/116 |

FOREIGN PATENT DOCUMENTS

| EP | 0889212 A | 1/1999 |
| JP | 9-236024 | 9/1997 |
| JP | 2877098 | 1/1998 |
| JP | 2000-104562 * | 4/2000 |
| WO | WO 03/071113 A1 | 8/2003 |

OTHER PUBLICATIONS

XP-002346415; Database WPI; Section PQ; Week 200029; Derwent Publications Ltd.; London; GB; Class Q52; AN 2000-333803; Apr. 11, 2000; Abstract.
"An Evaluation of the Effects of Water Injection on Compressor Performance" by A. White, et al. GT2003-38237, 2003, pp. 1-9.
"Inlet Fogging of Gas Turbine Engines-Part A: Fog Droplet Thermodynamics, Heat Transfer and Practical Considerations" by Mustapha Chaker, et al. GT-2002-30562, pp. 1-15, 2002.

* cited by examiner

*Primary Examiner*—L. J. Casaregola
(74) *Attorney, Agent, or Firm*—Mattingly, Stanger, Malur & Brundidge, PC

(57) ABSTRACT

A gas turbine system comprises a compressor for compressing air, a combustor for burning the air compressed by the compressor and fuel, a turbine driven by combustion gases produced from the combustor, and a spraying apparatus for adding water to working air at least upstream or in an intermediate stage of the compressor. A rotationally symmetric groove or projection is formed in an inner wall surface defining a channel through which the working air added with the water flows, or in a channel-defining surface of a rotor or a casing of the gas turbine. A larger amount of water can be supplied to the compressor while improving the reliability of the gas turbine.

9 Claims, 3 Drawing Sheets

GAS TURBINE SYSTEM

BACKGROUND OF THE INVENTION

1. Field of the Invention

The present invention relates to a gas turbine system, and more particularly to a gas turbine system suitable for use with water atomization cooling performed by adding atomized water to working air.

2. Description of the Related Art

As one of methods for avoiding a reduction of the gas turbine output attributable to a rise of the atmospheric temperature in the summer season, etc., water atomization cooling performed by adding atomized water upstream of a compressor or in its intermediate stage has hitherto been proposed as described in, e.g., Patent Reference 1 (Japanese Patent No. 2877098), Non-Patent Reference 1 (ASME (American Society of Mechanical Engineer), GT2003-38237), and Non-Patent Reference 2 (ASME (American Society of Mechanical Engineer), GT2002-30562). In such water atomization cooling, it is generally known that an effect of increasing the gas turbine output is enhanced as the amount of water evaporated until leaving the compressor increases.

SUMMARY OF THE INVENTION

However, adding a large amount of atomized water upstream of the compressor increases the amount of water droplets adhering on wall surfaces of an inlet duct and a casing. Water films thus formed on the wall surfaces are torn off by a main stream into large water droplets, which are drifted with the main stream and strike against the wall surfaces. That phenomenon may deteriorate reliability with a risk of causing erosion, for example. In particular, it has recently been discussed to increase the amount of inlet fogging. More specifically, while a rate of the amount of inlet fogging with respect to the amount of inlet air was about 1% in the past, the rate has been increased to 3% or more with intent to increase the gas turbine output. However, such an increase in the amount of inlet fogging further increases the amount of water droplets adhering on the wall surfaces, and makes the above-mentioned problem more noticeable.

Accordingly, it is an object of the present invention to provide a gas turbine system capable of supplying a larger amount of water to a compressor while improving the reliability of a gas turbine.

(1) To achieve the above object, the present invention provides a gas turbine system comprising a compressor for compressing air; a combustor for burning the air compressed by the compressor and fuel; a turbine driven by combustion gases produced from the combustor; and a spraying apparatus for adding water to working air at least upstream or in an intermediate stage of the compressor, wherein a rotationally symmetric groove or projection is formed in an inner wall surface defining a channel through which the working air added with the water flows.

With that arrangement, a larger amount of water can be supplied to the compressor while improving the reliability of the gas turbine.

(2) In above (1), preferably, the rotationally symmetric groove or projection is formed plural in adjacent relation.

(3) In above (1), preferably, the rotationally symmetric groove or projection has an edge on the downstream side in a direction of flow of intake air.

(4) In above (1), preferably, the rotationally symmetric groove or projection has a rectangular sectional shape.

(5) In above (1), preferably, the rotationally symmetric groove is opened in a direction toward more closely opposed relation to the direction of flow of the intake air near the groove.

(6) In above (1), preferably, a porous medium is inserted in the rotationally symmetric groove.

(7) In above (1), preferably, the rotationally symmetric groove or projection is formed in a channel-defining surface of a rotor or a casing of the gas turbine.

(8) In above (1), preferably, the rotationally symmetric groove or projection is formed in a mainstream channel surface near an inlet casing of the compressor.

(9) In above (1), preferably, the rotationally symmetric groove or projection is formed in the mainstream channel surface near a delivery diffuser of the compressor.

(10) In above (1), preferably, the rotationally symmetric groove or projection is present between an inner air extraction point in the compressor and a cooling air guide hole formed in a rotor.

(11) In above (1), preferably, a drain channel is provided below the rotationally symmetric groove or projection in the direction of gravity.

According to the present invention, it is possible to supply a larger amount of water to a compressor while improving the reliability of the gas turbine.

DESCRIPTION OF THE PREFERRED EMBODIMENTS

The construction of a gas turbine system according to one embodiment of the present invention will be described below with reference to FIGS. 1 through 4.

Figure 1:
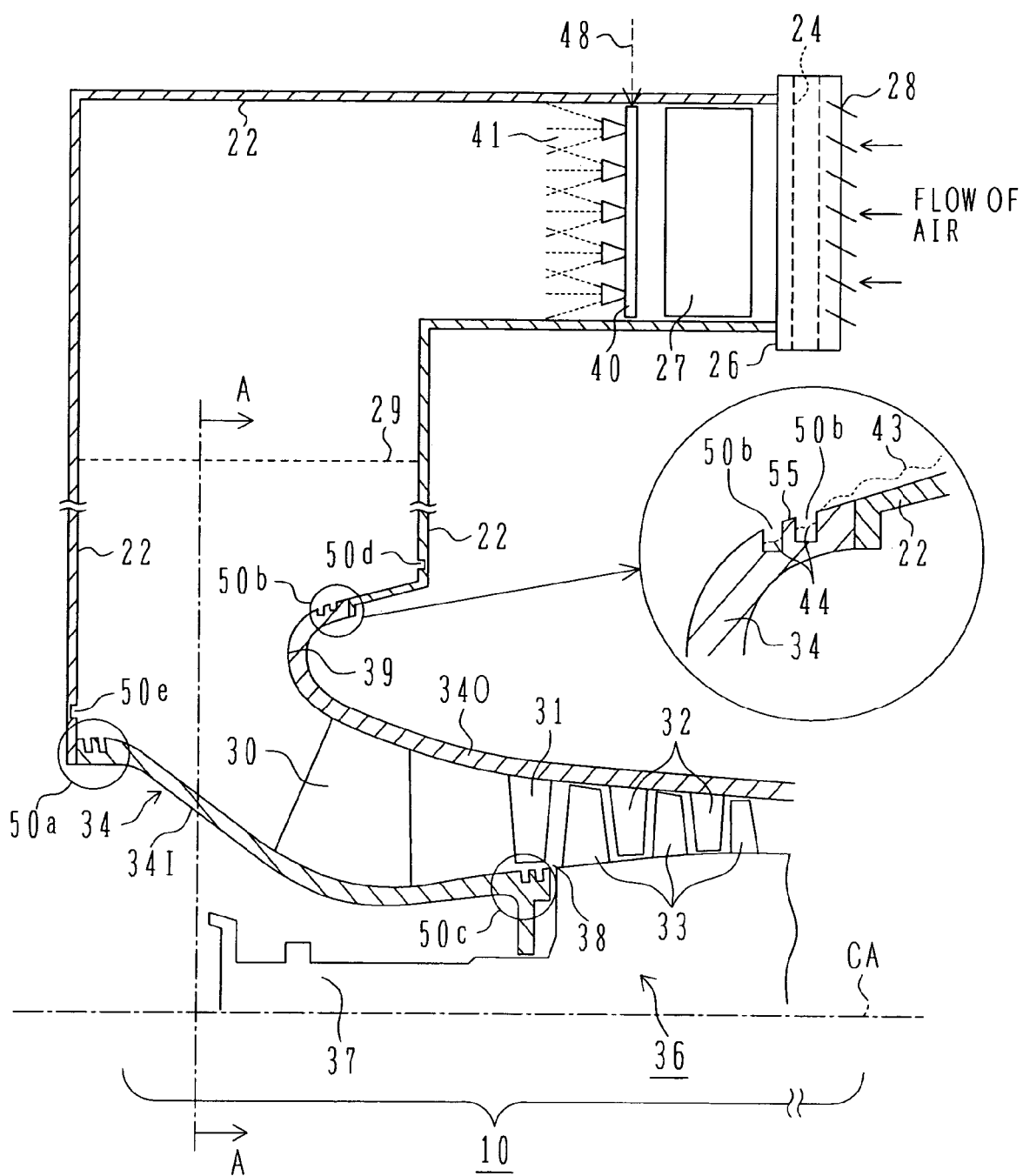
FIG. 1 is a schematic view showing the construction of a gas turbine system according to one embodiment of the present invention.

A description is first made of the principal construction of the gas turbine system according to this embodiment with reference to FIG. 1.

FIG. 1 is a schematic view showing the construction of the gas turbine system according to one embodiment of the present invention, the view primarily showing an inlet section of a compressor.

A compressor 10 comprises a rotor system 36 to which compressor rotor blades 33 are fixed, and a casing 34 made up of an outer casing 34O to which compressor stator vanes 32 are mounted and an inner casing 34I. The rotor system 36 and the casing 34 are each constructed to be rotationally symmetric with respect to a center axis CA.

To the upstream side of the compressor 10, an inlet duct 22 is coupled to take in air (atmosphere) for supply to the compressor 10. The inlet duct 22 is substantially in the form of a parallelepiped. An inlet filter housing 26 including a filter 24 mounted therein is disposed at a lead end of the inlet duct 22, and a louver 28 is disposed upstream of the inlet filter housing 26.

In the inlet duct 22, a silencer 27, a spraying apparatus 40, and a trash screen 29 are installed in this order from the upstream side. Note that the order in which those units are arranged is not limited to the illustrated one, and the spraying apparatus 40 may be installed upstream of the silencer 27. Further, the spraying apparatus 40 may be installed in multiple stages. In the gas turbine system of this embodiment, the spraying apparatus 40 is used to add an appropriate amount of atomized water to the intake air depending on operating conditions.

The air having flown downward through the inlet duct 22 together with the atomized water sprayed from the spraying apparatus 40 is rectified by a strut 30 connecting the outer casing 34O and the inner casing 34I to each other. After being given with an appropriate swirling speed by an inlet guide vane 31, the air is compressed by the compressor rotor blades 33 and the compressor stator vanes 32. The air compressed by the compressor 10 is supplied to a combustor in which the air is mixed with fuel and burnt to produce combustion gases. Then, the combustion gases are discharged to the atmosphere while expanding and driving a turbine. The compressor rotor blades 33 are coupled to rotor blades of the turbine 14 through the rotor system 36 so that turbine power obtained by the turbine rotor blades is converted to power for driving the compressor. The remainder resulting from subtracting the compressor power from the turbine power is obtained as a gas turbine output and is converted to electric power by a generator (not shown) that is coupled to a shaft end 37.

The above-mentioned flow of air is in the case of a gas turbine system in which a simple cycle is employed as the thermodynamic cycle. However, the present invention is not limited to the gas turbine system employing the simple cycle, and it is also applicable to gas turbine systems employing other thermodynamic cycles, such as a recuperative cycle and a HAT (Humid Air Turbine) cycle. Also, while this embodiment is on an assumption of an axial compressor, there is no essential difference depending on the compressor type, i.e., regardless of whether the compressor is of the centrifugal type or the axial and centrifugal composite type other than the axial type.

The spraying apparatus 40 can be constructed as, e.g., a spray nozzle. As an alternative, the spraying apparatus 40 may be, for example, replaced with the type supplying water to a structure disposed to face the interior of a channel through which the compressed air flows, and causing the supplied water to contact with the flow of the compressed air. A practically usable spraying apparatus employing a spray nozzle is disclosed, for example, in JP,A 9-236024. In this embodiment, the spraying apparatus 40 is disposed at an inlet of the compressor 10, e.g., at a position in the inlet duct 22 spaced from the stator vane of the first stage. A part or all of the added liquid water is evaporated until entering the compressed 10. The evaporation of the liquid water deprives heat contained in the intake air as latent heat consumed for evaporating the water and lowers the temperature of the intake air to the wet-bulb temperature. All or most of the remaining water droplets is evaporated within the compressor due to heat produced with a temperature rise of the air caused by compression work, thereby lowering the temperature of the air in the compression process.

While FIG. 1 shows the spraying apparatus 40 installed upstream of the compressor, a spraying apparatus (not shown) may be installed between adjacent stages of the compressor because a similar effect can also be obtained with the case adding water in the intermediate stage of the compressor. Such a modification is advantageous in that since water is added to the air having temperature raised with the compression work, the water can be avoided from icing on the casing surface even in the winter season where the temperature of the intake air is relatively low.

The spraying apparatus 40 is provided with a makeup water supply path 48 through which the water to be added to air is supplied. The makeup water supply path 48 can be constructed, for example, such that the water is introduced externally of a plant including the gas turbine system of this embodiment and associated equipment. As an alternative, the water may be recycled within the plant including the gas turbine system of this embodiment and associated equipment by recovering the used water. Further, when installing a plurality of the spraying apparatus, any of the spraying apparatuses employs makeup water supplied from the outside of the plant, while one or more other spraying apparatuses primarily utilize the recovered water.

Furthermore, in the gas turbine system of this embodiment, a groove 50 (such as 50a, 50b, 50c, 50d and 50e) is formed in the inlet duct 22 or the casing 34 to be rotationally symmetric with respect to a center axis CA. More specifically, the inner and outer casings 34I, 34O of the compressor 10 have rotationally symmetric grooves 50a, 50b and 50c formed in their wall surfaces facing an air mainstream channel. Further, rotationally symmetric grooves 50d, 50e are formed in a wall surface of the inlet duct 22 facing the air mainstream channel. Herein, of the casing 34 of the compressor 10, in particular, a compressor inlet portion positioned near the inlet duct 22 (i.e., an upstream portion of the casing 34 made up of the inner and outer casings 34I, 34O) are generally called an inlet casing and a bell-shaped portion 39 of the inlet casing is called a bell mouth. The grooves 50a, 50b are formed in an inlet portion of the bell mouth 39 of the casing 34. The groove 50c is formed in the casing 34 at the downstream side.

The shape of the rotationally symmetric groove 50 will be described below with reference to FIG. 2. The following description is made of, by way of example, the shape of the groove 50d.

Figure 2:
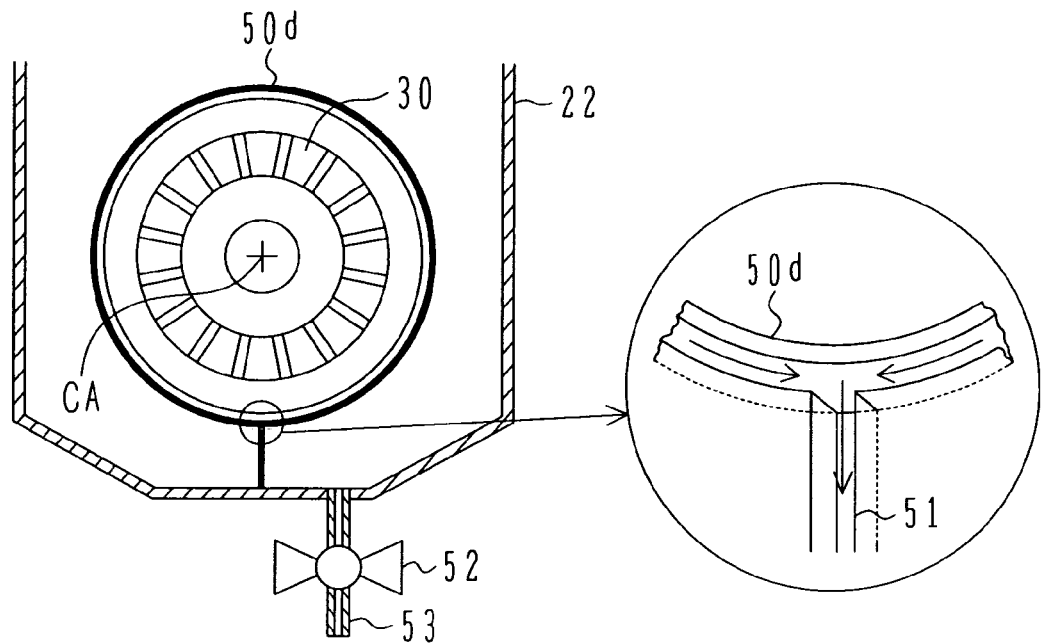
FIG. 2 is a view taken along the line A-A in FIG. 1, looking in the direction of an arrow A.
Figure 3A:
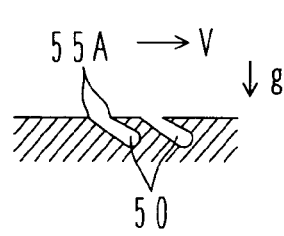
FIG. 3 is an explanatory view for explaining other sectional shapes of a rotationally symmetric groove formed in the gas turbine system according to one embodiment of the present invention.
Figure 3B:
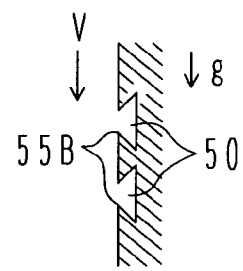
Figure 3C:
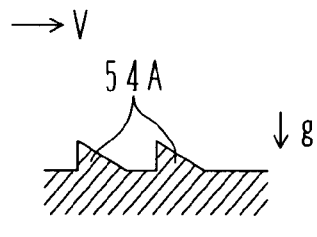
Figure 3D:
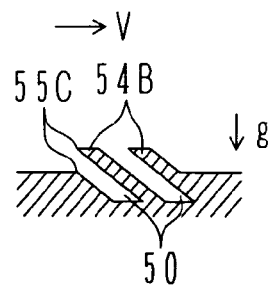

FIG. 2 is a view taken along the line A-A in FIG. 1, as viewed in the direction of an arrow A, for explaining one of the rotationally symmetric grooves formed in the gas turbine system according to one embodiment of the present invention. Note that the same symbols as those in FIG. 1 denote the same parts.

The rotationally symmetric groove 50d located in the wall surface of the inlet duct 22 is formed to be rotationally symmetric with respect to the center axis CA, i.e., to have an annular shape. At the bottom of the groove 50d, a vertically extending groove 51 is formed to introduce the water pooled in the groove to a bottom surface of the inlet duct 22. Because the water recovered into the groove 50d is less affected by the main air stream after being dropped in the groove 50d, the recovered water moves downward under the action of gravity along the groove 50d and is then introduced to the duct bottom surface through the vertically extending groove 51. The water pooled on the duct bottom surface is discharged to the outside of the gas turbine system through a drainpipe 53 by periodically opening a valve 52.

As shown in FIG. 1, in this embodiment, the rotationally symmetric grooves 50a to 50e are formed in the inlet casing and at an outlet of the inlet duct, and the intake air for the gas turbine is introduced to the interior of the compressor 10 after passing above those grooves. From the viewpoint of minimizing disturbances and losses imposed on the main stream of the intake air, it is more desired to form the grooves in the wall surfaces of the casing and the duct facing the mainstream channel instead of projections. Also, in order to cope with a situation where a water film cannot be completely removed by only one row of groove, it is also desired to form a plurality of rotationally symmetric grooves in adjacent relation. In that case, for the purpose of shortening the distance over which the liquid water spilling out of the upstream-side groove is possibly torn off by the main air stream, a proper spacing between the adjacent grooves is substantially equal to or several times the groove width. If there is no problem from the viewpoint of structural strength, the adjacent grooves may be formed at a smaller spacing.

Looking at a sectional shape, the rotationally symmetric groove 50b in this embodiment has a conspicuous edge 55 formed at its opening on the downstream side in the direction of the main air stream. The conspicuous edge 55 has an acutely angled shape, i.e., a shape acting to prevent the water droplets, which have flown into the groove 50b, from being sucked out of the groove again by the air stream and being mixed in the intake air. So long as the groove has at least one conspicuous edge, the groove is basically allowed to have any sectional shape. The groove 50 may have a simple rectangular sectional shape like the grooves 50b, 50d and 50e. The term "simple rectangular sectional shape" means that a center axis of the groove is perpendicular or parallel to the center axis CA. Further, like the grooves 50a and 50c, the groove may have a sectional shape having an opening space inclined in a direction toward more closely opposed relation to the main stream of the intake air. In the illustrated arrangement, it can be said that the groove 50b also has a sectional shape having an opening space inclined in a direction toward more closely opposed relation to the main stream of the intake air. The rotationally symmetric groove 50 is not always required to have a constant sectional shape at all positions in the circumferential direction, and it may include a portion having a rotationally asymmetric sectional shape in a part along the groove circumference for the reason of, e.g., restrictions imposed in machining. Depending on the mount position of the groove 50, a drain channel as indicated by 51 is FIG. 2 is desirably provided in a part of the circumference of the groove 50 to more efficiently drain the water pooled in the groove.

The operation and effect of the gas turbine system will be described below. Liquid water 41 added from the spraying apparatus 40 flow down inside the inlet duct 22 while mixing in the intake air. A part of the liquid water 41 is evaporated and lowers the temperature of the intake air to near the wet-bulb temperature. A part of the remaining water adheres on the duct wall surface during the flowing-down process inside the inlet duct 22. The remaining water is carried in the form of liquid water with the main stream of the intake air and is introduced to the compressor. Then, the introduced water is evaporated with a temperature rise of the compressed air and contributes to cooling the compressed air.

Generally, the larger a surface area of the liquid water per unit mass, the easier the liquid water is evaporated into air. In other words, as the liquid water has a shape closer to a sphere and a smaller diameter, the liquid water is more apt to evaporate into air. The water adhering on the wall surface has a smaller contact area with air because of being contacted with the wall surface. Further, the water droplets adhering on the wall surface join with each other to form a water film, and therefore the liquid water has an even smaller contact area with air per unit mass. Thus, the water droplets adhering on the wall surface become harder to evaporate. Accordingly, many of the water droplets adhering on the wall surface of the inlet duct flow downward under the action of gravity along the wall surface without evaporating, and are gradually accumulated so as to form a thick film. If the formed water film is left as it is, the water film is torn off by the main air stream at a rear edge of the blade (vane), a gap 38 between the casing and the rotor, etc. to form large water droplets. Those large water droplets strike against the wall surface and the blade (vane) surface, thereby causing erosion. To avoid that problem, the water film adhering on the wall surface must be recovered as drain before the water film is scattered in the form of large water droplets.

In the gas turbine system of this embodiment, since the rotationally symmetric grooves 50a to 50e are formed in the duct wall surface and the casing wall surface, the water film having moved along the wall surfaces is captured by those grooves 50. Looking at the groove 50b in FIG. 1, for example, a water film 43 moving over the wall surface of the inlet duct 22 is captured by the groove 50b and becomes liquid water 44 that is pooled in the groove. Though depending on the groove depth, the liquid water 44 having dropped in the groove is generally less affected by the main air stream in the direction thereof, and is caused to move primarily downward under the action of gravity along the groove. By providing an appropriate drain at a position below the groove in the direction of gravity, it is possible to collect the water film, which has adhered on the wall surface and has become harder to evaporate, in the grooves 50a to 50e and to remove the collected water to the outside of the gas turbine system.

The amount of the water film adhering on the wall surface, e.g., the water film 43, is increased in proportion to the amount of liquid water added to the intake air. Accordingly, as the amount of liquid water added to the intake air increases, a possibility of the water film being scattered in the form of large water droplets and causing erosion is increased. With the gas turbine system of this embodiment, however, since the liquid water adhering on the wall surface is properly recovered by the rotationally symmetric grooves 50, a larger amount of the water can be added to the compressed air without deteriorating the reliability of the gas turbine system. As a result, it is possible to remarkably suppress a reduction of the gas turbine output, which is otherwise caused when the atmospheric temperature is relatively high, e.g., in the summer season. Further, because of basically having a rotationally symmetric shape, the groove can be easily machined to complete by a lathe or the like at a low cost.

While there has been such common knowledge that an increase in the amount of water evaporated upstream of and inside the gas turbine increases the gas turbine output, it has hitherto been thought in the art that an increase in the amount of added water causes erosion with a higher possibility. However, since the water added upstream of the compressor is sprayed after being sufficiently atomized by the spraying apparatus 40 into diameters of not larger than 10 μm, for example, the atomized water provides a relatively small collision impact and does not cause erosion in such atomized form. The problem arises when the liquid water adhering on the wall surface becomes large water droplets and these large water droplets are carried again with the main air stream. Therefore, even when the amount of added water is increased, a possibility of causing erosion can be avoided if the liquid water adhering on the wall surface can be properly recovered before the formation of the large water droplets. As a result, this embodiment is able to increase the amount of added water and to provide a higher gas turbine output without deteriorating the reliability of the gas turbine.

A part of the liquid water 41 added upstream of the inlet duct 22 adheres on the duct wall surface due to disturbances and diversions of the air stream. The inlet duct 22 usually has the wall surface extending nearly vertically, and the duct wall surface is formed as a flat wall surface in many cases. Therefore, the water droplets having once adhered on the duct wall surface move downward along the duct wall surface under the action of gravity. Also, in order to provide a longer evaporation distance, the spraying apparatus 40 is desirably installed at a position spaced from the compressor as far as possible. From that point of view, the spraying apparatus 40 is installed upstream of the inlet duct 22, and hence the amount of liquid water adhering on the duct wall surface increases toward the downstream side of the inlet duct 22. Even the water adhering on the duct wall surface contributes to cooling the intake air. For that reason, it is desired to recover the water adhering on the duct wall surface at a position as close as possible to the compressor inlet. By forming the grooves 50 at positions near joint portions between the inlet duct 22 and the inner and outer casings 34I, 34O like the grooves 50a, 50b, 50d and 50e, therefore, the water adhering on the duct wall surface can be evaporated into the intake air in a larger amount. Further, at those groove positions, the water film on the duct wall surface is sufficiently developed, whereby the effect of recovering water can be increased. As a result, it is possible to reduce the number of grooves to be formed in the whole of the gas turbine, and to cut the production cost.

There is a high possibility that the water film adhering on the duct wall surface is torn off by the air stream and scattered into the main air stream at positions corresponding to the bell mouth 39 where the direction of the air stream is changed, the gap 38 between the casing and the rotor where the wall surface is interrupted, etc. By forming the grooves just upstream of the positions where a possibility of the water film being scattered into the main air stream is high, as represented by the grooves 50b and 50C in this embodiment, and recovering the liquid water, a larger amount of water can be evaporated into the main air stream, thus resulting in a higher gas turbine output and more effective use of the added water.

The groove sectional shape can be simply rectangular like the grooves 50b and 50d. As another example, like the grooves 50a and 50c, the groove sectional shape may be selected such that an opening space is inclined in a direction toward more closely opposed relation to the main stream of the intake air. In the latter case, since the opening space is inclined in the direction toward more closely opposed relation to the main air stream, the liquid film having been dragged in the direction of the main air stream is allowed to more easily enter the groove, and the liquid water having once flown into the groove can be prevented from being dragged with the main air stream and leaking out of the groove again. It is therefore possible to reliably suppress the formation of large water droplets, and to improve the reliability of the gas turbine.

Other sectional shapes of the groove 50 will be described below with reference to FIG. 3.

FIG. 3 is an explanatory view for explaining other sectional shapes of the rotationally symmetric groove formed in the gas turbine system according to one embodiment of the present invention. In FIG. 3, an arrow V indicates the flow direction of the intake air, and an arrow g indicates the direction of gravity. Note that the same symbols as those in FIG. 1 denote the same parts.

The sectional shape of the rotationally symmetric groove formed in this embodiment is not limited to a rectangular shape. More specifically, as shown at (a) and (b) in FIG. 3, the groove may be formed as any of grooves 55A, 55B having such a shape that an opening space of the groove has a narrower entrance and gradually widening toward the bottom of the opening space. With that groove shape, a rate of capturing the water film on the wall surface can be increased and a bottom portion 50 of the groove serves to reserve a larger amount of water captured. It is therefore possible to suppress the water from spilling out of the groove, and to collect a larger amount of water in the groove.

Alternatively, as shown at (c) in FIG. 3, the groove may be replaced with a projection 54A having a triangular section. Further, as shown at (d) in FIG. 3, the groove may be formed as a groove 55C in combination with a projection 54B provided downstream of the groove 55C.

Regarding the groove sectional shape, the width and depth of each groove can be basically set to appropriate values depending on the amount of water flowing in the groove. However, if the groove opening size or the groove width is too narrow, the water droplets would bridge over the groove opening, or the captured water would be hard to flow in the groove due to the capillary phenomenon and viscosity of the water. Accordingly, the groove opening size or the groove width is desirably set to a value in the range of about 1-10 mm. Also, the groove depth requires to be set to a value in the range of about 5-20 mm.

Another structure of the groove 50 will be described below with reference to FIG. 4.

Figure 4:
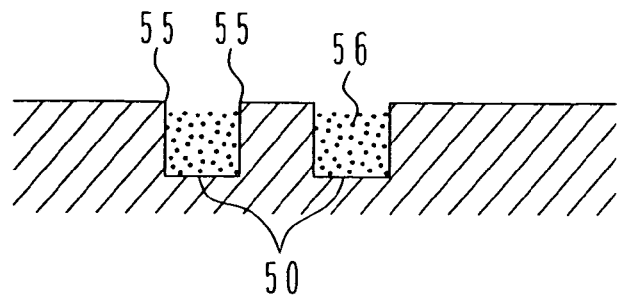
FIG. 4 is a sectional view showing another structure of the rotationally symmetric groove formed in the gas turbine system according to one embodiment of the present invention.

FIG. 4 is a sectional view showing another structure of the rotationally symmetric groove formed in the gas turbine system according to one embodiment of the present invention. Note that the same symbols as those in FIG. 1 denote the same parts.

A porous medium 56 can be inserted in the groove 50. The porous medium 56 may be made of a ceramic such as alumina. With the structure employing the porous medium 56 inserted in the groove 50, the water having once flown into the groove is absorbed by the porous medium 56 and moves downward through the porous medium 56 under the action of gravity. Then, the water drips from a lower end of the porous medium 56 and is recovered as a drain. The porous medium 56 inserted in the groove 50 causes the captured water to move along the porous medium 56 with the surface tension of water, and is able to completely prevent the water, which has been once captured in the groove, from being dragged with the main air stream and leaking out of the groove again.

According to this embodiment, as described above, a larger amount of water can be supplied to the compressor while improving the reliability of the gas turbine.

The construction of a gas turbine system according to another embodiment of the present invention will be described below with reference to FIG. 5.

Figure 5:
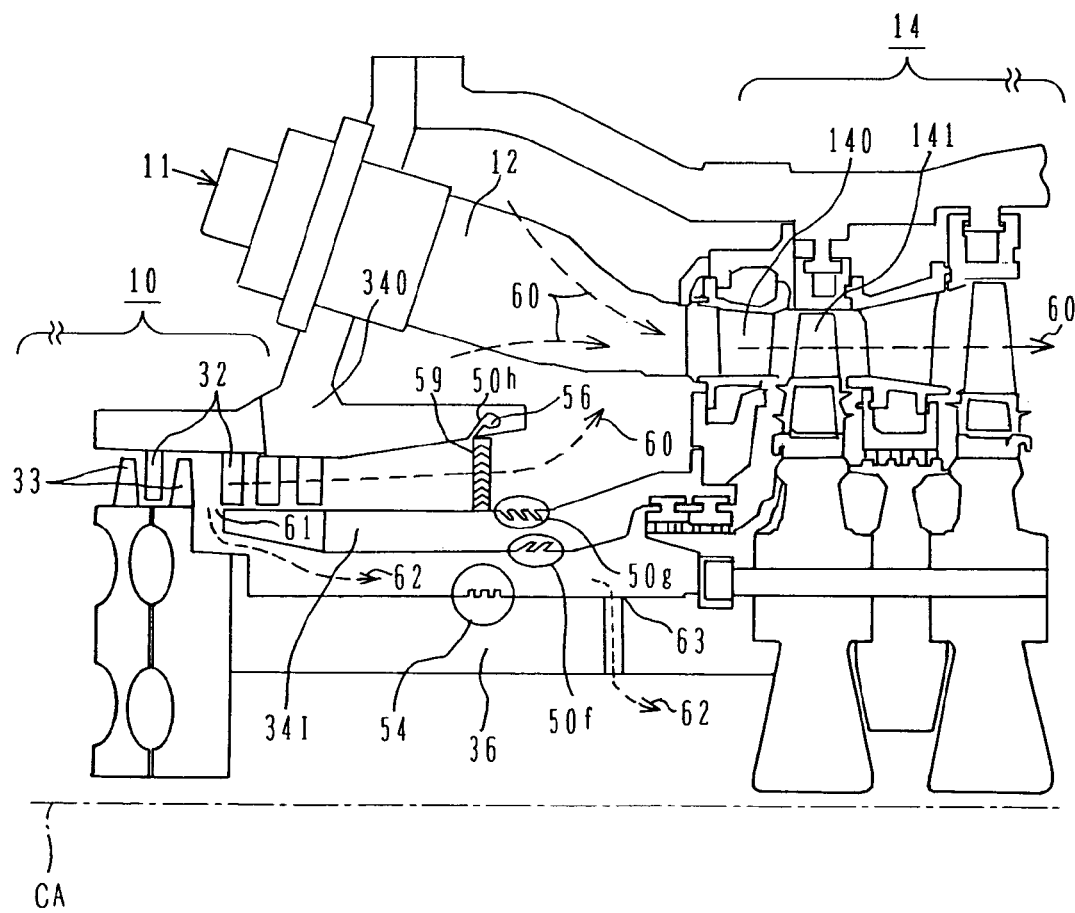
FIG. 5 is a schematic view showing the construction of a gas turbine system according to another embodiment of the present invention.

FIG. 5 is a schematic view showing the construction of the gas turbine system according to another embodiment of the present invention. FIG. 5 primarily shows a region of the gas turbine system covering a delivery section of the compressor 10, the combustor 12, and the turbine 14. Note that the same symbols as those in FIG. 1 denote the same parts.

In this embodiment, rotationally symmetric grooves 50*f*, 50*g* and 50*h* and a projection 54 are formed near the delivery section of the compressor 10 and in a path of turbine cooling air. In the illustrated example, components other than the combustor 12 are constructed to be rotationally symmetric with respect to the center axis CA.

A broken line 60 in FIG. 5 represents a main air stream flowing from the delivery section of the compressor 10 to an outlet of the turbine 14. After leaving the delivery section of the compressor 10, the main air stream 60 passes through the combustor 12 in which air is mixed with fuel 11 and is burnt. Resulting combustion gases are supplied to the turbine 14 and then released to the atmosphere through a stack (not shown), for example, after passing stator vanes 140 and rotor blades 141 of the turbine.

In the gas turbine system of this embodiment, as described above, since liquid water is added to working air from the spraying apparatus 40 or the like upstream of the compressor 10 or in its intermediate stage, the absolute humidity of air in the delivery section of the compressor is higher than that of open air. Depending on the amount of added water, there is a possibility that the liquid water added from the spraying apparatus 40 still remains in the delivery portion of the compressor 10 without being completely evaporated. In a blade row of the compressor 10, a field of strong swirling flow is formed about a rotor shaft. Therefore, even if any water droplets remain in the interior of the compressor, larger water droplets are forced to drift toward the outer casing under the action of centrifugal forces. This means that the water droplets remaining in the main air stream near the delivery section of the compressor 10 are primarily fine water droplets which are dominantly affected by the viscosity effect of air rather than the centrifugal forces, and most of those fine water droplets is evaporated until reaching the delivery section of the compressor 10. Accordingly, the liquid water remaining near the delivery section of the compressor 10 is primarily present on the casing surface. In other words, recovering the liquid water on the casing surface greatly contributes to preventing the formation of large water droplets.

In some cases, moisture in air may condense during shutdown of the gas turbine and dew condensation of the moisture may occur on the wall surfaces of the casing and the rotor. In an ordinary step of shutting down the gas turbine, the spraying apparatus 40 is first stopped and a main unit of the gas turbine is then stopped after sufficiently purging out the moisture residing within the compressor 10 by supplying dried air. Therefore, if the step of shutting down the gas turbine is performed in the proper sequence, excessive moisture is avoided from condensing within the gas turbine. In the case of emergency shutdown of the gas turbine, however, the gas turbine is often quickly stopped without sufficiently purging out the water added to the interior of the gas turbine. Such a situation leads to a possibility that, due to the added water and the highly humid air remaining within the gas turbine, dew condensation of moisture occurs on the casing wall surface defining the gas path and the rotor wall surface in a larger amount than that in the usual case.

In view of the above-mentioned problem, the gas turbine system of this embodiment includes the rotationally symmetric groove 50*h* formed in an inner peripheral surface of the outer casing 34O and the rotationally symmetric groove 50*g* formed in an outer peripheral surface of the inner casing 34I with intent to remove the liquid water adhering on the casing wall surface. Stated another way, the grooves 50*g*, 50*h* are formed in the surface of the mainstream channel near a delivery diffuser. Particularly, the groove 50*h* has a liquid water reservoir 56 to prevent the water, which has once flown into the groove 50*h*, from moving out of the groove again under the action of gravity. Additionally, if there is a large amount of water droplets flowing through the mainstream channel, a mist separator 59 may be installed near the delivery section of the compressor to remove the water droplets flowing through the mainstream channel. As a result, a highly reliable gas turbine system can be provided which can prevent the formation of large water droplets and can avoid damages of high-temperature members caused by erosion attributable to collision of the water droplets and thermal impacts attributable to contact of the water droplets with the high-temperature members.

Further, in the gas turbine system of this embodiment, an inner air extraction hole 61 for introducing cooling air to cool a high-temperature portion of the rotor is formed at an inner periphery of the gas path within the compressor. While the air extraction hole 61 is formed in the delivery stage of the compressor in FIG. 5, it may be formed in the intermediate stage of the compressor. Instead of the air extraction hole 61, a circumferential gap (slit) may be formed for extraction of the cooling air. Cooling air 62 introduced through the air extraction hole 61 flows between the inner casing of the compressor 10 and the rotor 36 while cooling the rotor 36. Further, the cooling air 62 is introduced to the interior of the rotor 36 through a cooling air guide hole 63 formed in a rotor wall, to thereby cool the interior of the rotor. In a cooling path through which the cooling air 62 flows from the air extraction hole 61 to the guide hole 63, the gas turbine system of this embodiment includes the rotationally symmetric groove 50*f* formed in an inner peripheral surface of the inner casing 34I and the projection 54 formed on an outer peripheral surface of the rotor 36. Stated another way, the groove 50*f* and the projection 54 are formed between the inner air extraction point in the compressor and the cooling air guide hole in the rotor. Liquid water having moved along the rotor wall surface from the mainstream channel in the compressor and entered the cooling path is blown off toward the casing wall surface by centrifugal forces upon striking against the projection 54 and is prevented from flowing into the guide hole 63. Also, a water film having been dragged over the casing wall surface with a flow of the cooling air 62 is separated from the cooling air flow upon reaching the groove 50*f* and then enters the groove 50*f* for recovery as a drain. In such a way, the liquid water having flown into the cooling path is also recovered with the provision of the rotationally symmetric groove and projection. As a result, a highly reliable gas turbine system can be provided which can prevent the formation of large water droplets and can avoid damages of high-temperature members caused by erosion attributable to collision of the water droplets and thermal impacts attributable to contact of the water droplets with the high-temperature members.

The sectional shapes of the groove and the projection in this embodiment are not limited to those shown in FIG. 5, and the groove or the projection may have any other suitable sectional shape so long as it has at least one conspicuous edge. An essentially similar effect can be obtained by using any of the sectional shapes shown, by way of example, in FIG. 3. Further, as shown in FIG. 4, the porous medium 55 may be inserted in the groove 50 (50*f*).

According to this embodiment, as described above, a larger amount of water can be supplied to the compressor while improving the reliability of the gas turbine.

What is claimed is:

1. A gas turbine system comprising:
 a compressor for compressing air;
 a combustor for burning the air compressed by said compressor and fuel;
 a turbine driven by combustion gases produced from said combustor; and
 a spraying apparatus for adding water to working air at least upstream or in an intermediate stage of said compressor,
 a casing defining a channel through which the working air with added water flows;
 wherein a rotationally symmetric groove or projection is formed in an inner wall surface of said casing, and
 wherein said rotationally symmetric groove or projection is formed at an inlet of a bell mouth of said casing.

2. The gas turbine system according to claim 1, further including plural ones of said rotationally symmetric groove or projection formed in adjacent relation.

3. The gas turbine system according to claim 1, wherein said rotationally symmetric groove or projection has an edge on the downstream side in a direction of flow of intake air.

4. The gas turbine system according to claim 1, wherein said rotationally symmetric groove or projection has a rectangular sectional shape.

5. The gas turbine system according to claim 1 wherein at least one side wall of said rotationally symmetric groove is inclined in a direction opposing the direction of flow of the intake air near said groove.

6. The gas turbine system according to claim 1, wherein a porous medium is inserted in said rotationally symmetric groove.

7. The gas turbine system according to claim 1, wherein said rotationally symmetric groove or projection is fonned in a channel-defining surface of a rotor or a casing of said gas turbine.

8. The gas turbine system according to claim 1, wherein said rotationally symmetric groove or projection is formed in a mainstream channel surface near an inlet casing of said compressor.

9. The gas turbine system according to claim 1, wherein a drain channel is provided below said rotationally symmetric groove or projection in the direction of gravity.

* * * * *